US011995570B1

(12) United States Patent
Wendel et al.

(10) Patent No.: US 11,995,570 B1
(45) Date of Patent: May 28, 2024

(54) SYSTEMS AND METHODS FOR DIGITAL ADVICE

(71) Applicant: United Services Automobile Association (USAA), San Antonio, TX (US)

(72) Inventors: Mollie Wendel, Helotes, TX (US); Robert J. Eckelbarger, San Antonio, TX (US); Stephen Holloway, San Antonio, TX (US); Matthew J. Kosub, San Antonio, TX (US); Lyndsey Nicole Stevens, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/658,762

(22) Filed: Apr. 11, 2022

Related U.S. Application Data

(63) Continuation of application No. 16/899,274, filed on Jun. 11, 2020, now Pat. No. 11,301,764.

(60) Provisional application No. 62/860,628, filed on Jun. 12, 2019.

(51) Int. Cl.
*G06F 3/0482* (2013.01)
*G06N 5/04* (2023.01)
*H04L 67/306* (2022.01)
*H04L 67/50* (2022.01)

(52) U.S. Cl.
CPC ............ *G06N 5/04* (2013.01); *G06F 3/0482* (2013.01); *H04L 67/306* (2013.01); *H04L 67/535* (2022.05)

(58) Field of Classification Search
CPC ....... G06N 5/04; H04L 67/535; H04L 67/306; G06F 3/0482
See application file for complete search history.

(56) References Cited

U.S. PATENT DOCUMENTS

| 10,223,754 | B1* | 3/2019 | Lopez | G06Q 40/12 |
|---|---|---|---|---|
| 2010/0280935 | A1* | 11/2010 | Fellowes | G06Q 40/00 705/35 |
| 2012/0254055 | A1* | 10/2012 | Bullen | G06Q 10/06 705/321 |
| 2020/0167815 | A1* | 5/2020 | Naik | G06Q 50/22 |
| 2020/0250508 | A1* | 8/2020 | De Magalhaes | G06N 3/006 |
| 2020/0315528 | A1* | 10/2020 | Stenstrom | G16H 50/70 |

(Continued)

OTHER PUBLICATIONS

Joseph A. Cazier et al., Life Coach: Using Big Data and Analytics to Facilitate the Attainment of Life Goals, Jan. 1, 2016, Hawaii International Conference on System Sciences, pp. 1000-1008 (Year: 2016).*

(Continued)

*Primary Examiner* — Tam T Tran
(74) *Attorney, Agent, or Firm* — Fletcher Yoder, P.C.

(57) ABSTRACT

The present disclosure relates to methods and systems for providing personalized digital advice. A digital advisor service applies cross-entity historical interaction (e.g., behavior attributes) to one or more predictive models to identify one or more personalized goals for a user. The digital advisor service provides, via an application programming interface, the identified one or more personalized goals to an entity service, enabling the entity service to present the one or more personalized goals.

20 Claims, 13 Drawing Sheets

(56) References Cited

U.S. PATENT DOCUMENTS

2020/0364087 A1* 11/2020 Castinado ............. H04L 67/535
2020/0372823 A1* 11/2020 Edwards ................ G09B 19/18

OTHER PUBLICATIONS

S Marzic et al., Spending analysis systems, May 1, 2014, IEEE Xplore MIPRO, pp. 1497-1502 (Year: 2014).*

* cited by examiner

SYSTEMS AND METHODS FOR DIGITAL ADVICE

CROSS-REFERENCES TO RELATED APPLICATIONS

This application is a continuation of U.S. Non-Provisional patent application Ser. No. 16/899,274, entitled "Systems and Methods for Digital Advice," which was filed Jun. 11, 2020, which claims the benefit of U.S. Provisional Patent Application Ser. No. 62/860,628, titled "Systems and Methods for Digital Advice," which was filed on Jun. 12, 2019, which is herein incorporated by reference in its entirety for all purposes.

BACKGROUND

The present disclosure relates generally to systems and methods to facilitate digital advice (e.g., potential goals and progress steps to achieve those goals) from a plurality of entities (e.g., computer servers). More specifically, the methods and systems described herein provide digital advice over a plurality of independent computer systems.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

The Internet has brought about a connected world, where an increasing number of activities can be performed online. Unfortunately, oftentimes, these activity offerings lack personalization for a user. Due to a lack of information caused by being siloed from other systems, independent computer systems may not have the ability to understand a user's desires or potential future goals.

SUMMARY OF THE INVENTION

Embodiments of this disclosure include systems and methods for providing digital advice across multiple independent entities (e.g., independent computer servers/services). In particular, the current techniques relate to a digital advisor service that provides an application programming interface (API) that enables entities the ability to retrieve and provide digital advice via their independent services. The digital advisor services retrieves and accumulates behavioral information pertaining to the user from the entities and uses the behavior attributes (and potentially other attributes, such as demographic information) from the plurality of entities to identify personalized goals relevant to the user. The personalized goals are derived from behavior-attribute based models generated based upon accumulated training data that includes known goals corresponding to particular behavioral attributes (and potentially other attributes, such as demographic data).

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure are described above. In an effort to provide a concise description of these embodiments, certain features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

While only certain features of the disclosure have been illustrated and described herein, many modifications and changes will occur to those skilled in the art. For example, while the embodiments described herein include a specific logic organization for private information protection services, substantially similar benefits provided by the present invention may be obtained by trivial structural alterations such as changes in name or in non-substantial changes to the mode of operation of the data structures. It is, thus, to be understood that the appended claims are intended to cover all such modifications and changes as fall within the true spirit of the invention.

Figure 1:
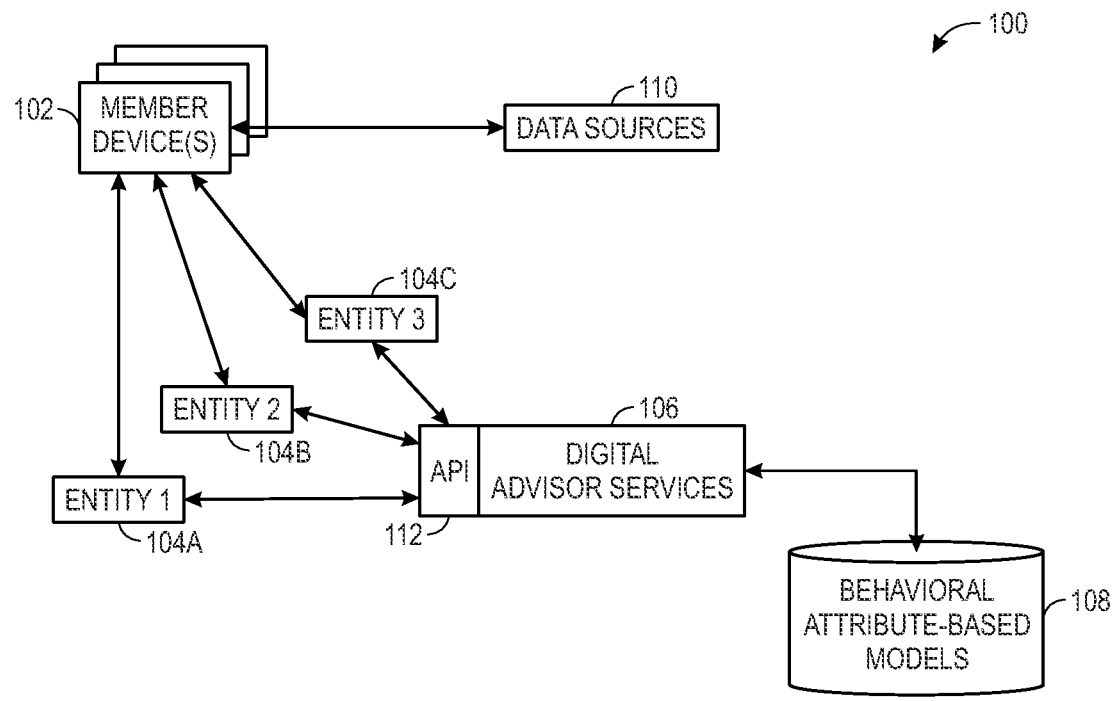
FIG. 1 is a block diagram, illustrating a system for provision of digital advice across entities, in accordance with embodiments of the present disclosure.
Figure 2:
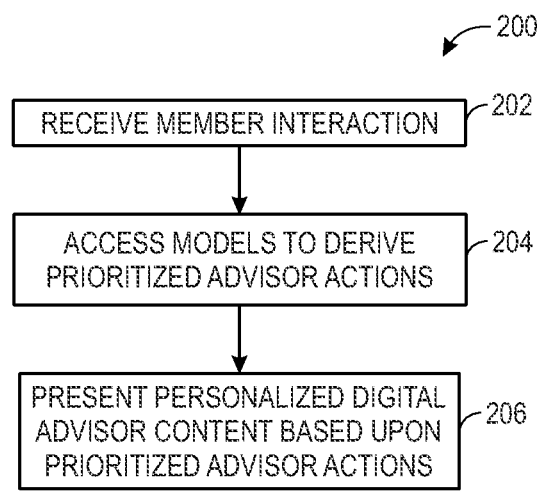
FIG. 2 is a flowchart, illustrating a process for providing digital advice, in accordance with an embodiment of the present disclosure.

Turning first to a discussion of an overall system for provision of digital advise, FIG. 1 is a block diagram, illustrating a system 100 for provision of cross-entity digital advice, in accordance with embodiments of the present disclosure. FIG. 2 is a flowchart, illustrating a process 200 for providing digital advice, in accordance with an embodiment of the present disclosure. For clarity, these figures will be discussed together.

The system 100 includes one or more user/member electronic devices 102 that can interface with entities (e.g., Entity 104A, Entity 104B, Entity 104C). For example, the member devices 102 may include a cellular telephone, a tablet computer, a personal computer, a laptop computer, etc. The entities may include independent electronic services running on computer systems that provide entity-specific services. For example, Entity 104A may provide electronic banking services, while Entity 104B provides Insurance-related electronic services, and Entity 104C provides investing/retirement services. Each of these services may be supported by separate divisions of a single organization or by multiple independent organizations. As mentioned above, the independent nature of these divisions and/or organizations has typically resulted in less personalized user experiences than can be afforded by the techniques described herein. In particular, the current system 100 includes a digital advisor service 106 that can act to provide cross-entity advice via the entities 104A, 104B, and/or 104C.

As will be discussed in more detail below, the digital advisor service 106 may use behavioral attributed-based models 108 to identify personalized goals and/or advise to attain a goal to a member via the entities 104A, 104B, and/or 104C. As illustrated in FIG. 2, the process 200 includes receiving member interactions/behavioral attributes (block 202). The digital advisor service 106 may obtain behavioral attributes of the member (e.g. member interactions) and/or other attributes of the member from the entities 104A, 104B, and/or 104C. Further, additional attributes pertaining to the member may be obtained from other sources 110, such as demographic information service providers, etc. The attributes may be provided to the digital advisor services 106 via an application programming interface (API) 112that provides an input pathway to the digital advisor service 106.

As illustrated in FIG. 2, the behavior attributed-based models are accessed to derive prioritized digital advisory actions (block 204). For example, returning to FIG. 1, the attributes attained from the entities 104A, 104B, 104C, and/or the other data sources 110 may be applied to the behavioral attribute-based models 108 to identify one or more goals and/or recommendations on steps to attain the goal from the behavioral attribute-based models 108. To apply the attributes to the models, patterns of the attained attributes may be compared with attributes in training data of the models 108 to find similarities and/or differences. Pattern similarities may suggest that goals and/or goal completion steps associated with the similar attributes in the models may be more relevant to the member than goals or goal steps associated with less-matching attributes. Conversely, pattern differences may suggest that goals and/or goal completion steps associated with the similar attributes in the models may be relatively less relevant to the member than goals or goal steps associated with closer-matching attributes.

Returning to FIG. 2, once one or more prioritized advisor actions are identified, the digital advisor may present the personalized digital advisor content based upon prioritized advisor actions (block 206). For example, the digital advisor service 106 of FIG. 1 may provide an indication of the prioritized digital advisor action via the API 112 to the entity 104A, 104B, and/or 104C that the member device 102 is interfacing with. From there, the entity 104A, 104B, and/or 104C may present, via a graphical user interface (GUI) the digital advise received from the digital advisor service.

Figure 3A:
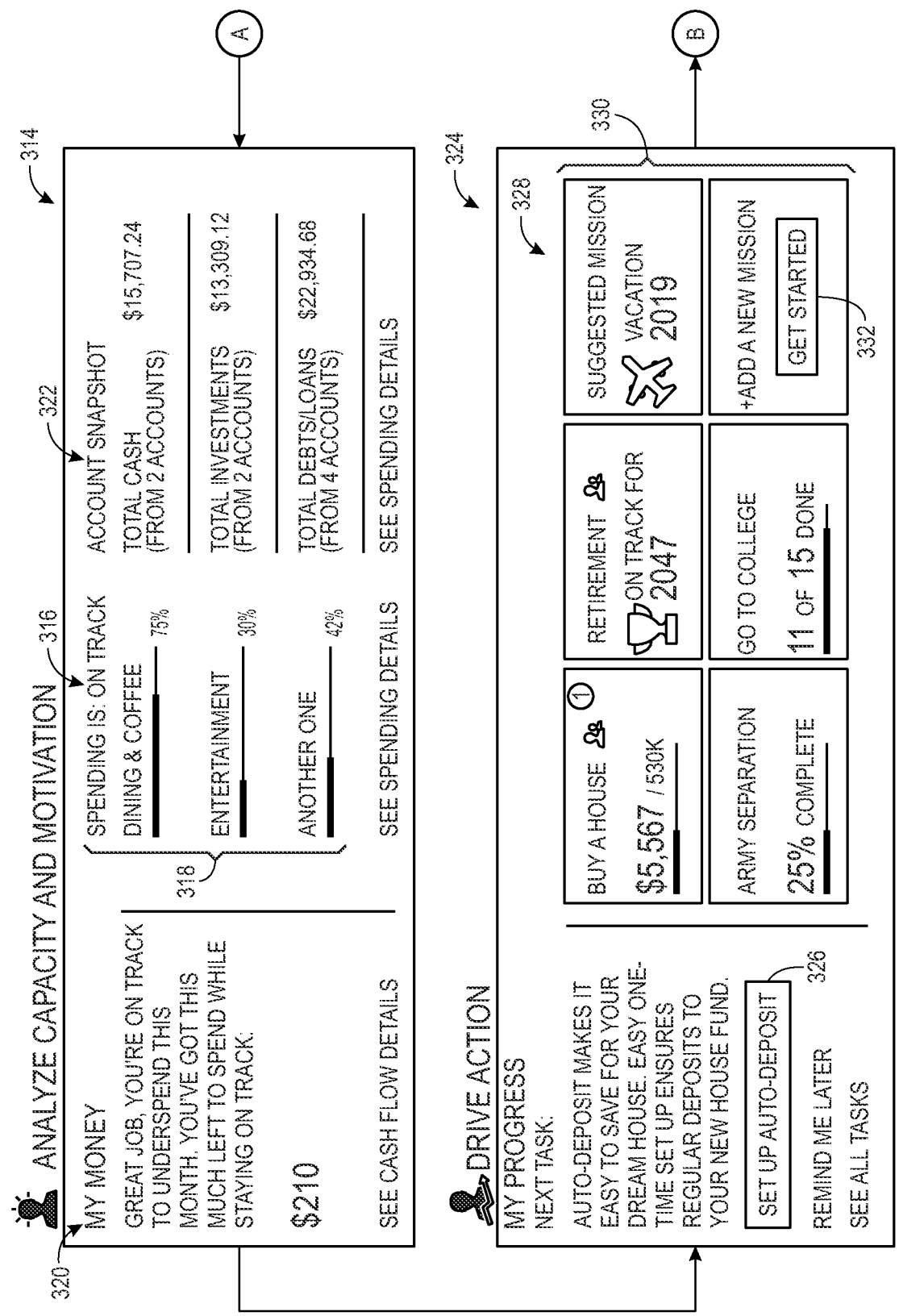
FIGS. 3A-3B are schematic diagrams, illustrating a digital advice lifecycle, in accordance with an embodiment of the present disclosure.
Figure 3B:
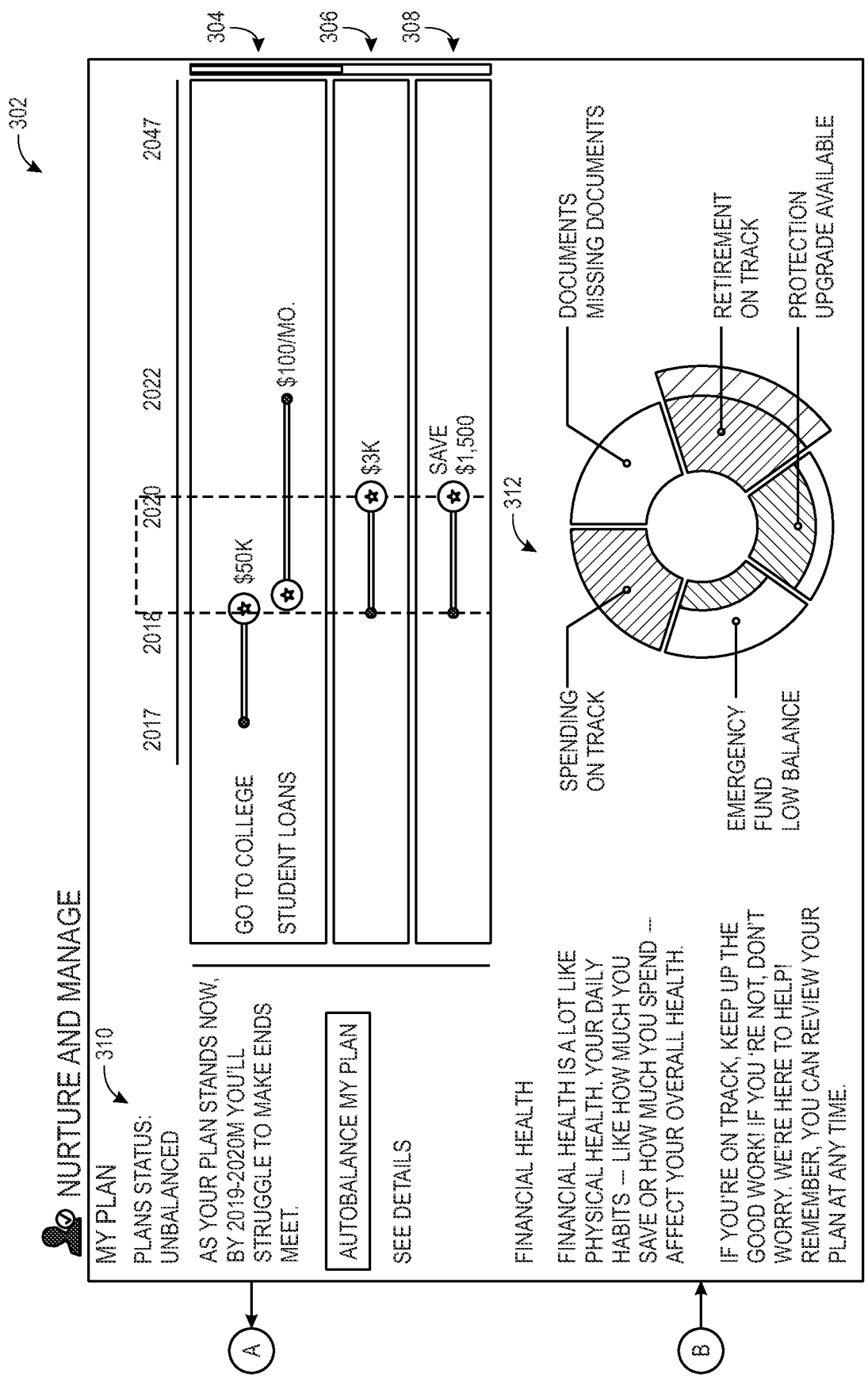

Having discussed the basic functionality of the digital advisor service 106, the discussion now turns to a particular example of provided digital advice. FIGS. 3A-3B are schematic diagrams, illustrating a digital advice lifecycle 300, in accordance with an embodiment of the present disclosure. The digital advice lifecycle 300 is a financial goal example, but is not intended to limit digital advice to financial advice.

The digital advice lifecycle 300 begins with a Nature and Manage GUI 302. The Nature and Manage GUI 302 provides personalized digital advice obtained from the digital advisor service 106 of FIG. 1. Multiple levels of digital advice may be provided. For example, the current Nature and Manage GUI 302 provides a plan to achieve multiple goals, including goal 304 to go to college (and pay off corresponding student loans), a goal 306 to buy a car, and a goal 308 to save for a vacation.

As mentioned above, the goals may be derived from attributes of the user/member that are applied to behavioral attribute-based models. For example, one data source and/or entity may provide attribute data that student loan payback may trigger soon. One data source and/or entity may indicate that a user/member have been navigating car-buying websites or car mortgage websites. Other data sources may indicate that the user has a pattern of attributes likely to indicate that the user will desire to take a vacation in the near future. In some situations attributes from multiple data sources and/or entities may provide a pattern that indicates a particular goal and/or goal steps.

Based upon the identified goals, higher-level goals may also be identified. For example, in the current embodiment, based upon the goals 304, 306, and/or 308 and attributes of the user (e.g., spending habits) an auto balance goal step recommendation 310 is provided via the Nature and Manage GUI 302. Further, a financial health section 312 is also provided, which provides an indication of user-specific financial pluses and minuses.

The lifecycle 300 also includes a Capacity Analysis and Motivation GUI 314. As mentioned above, personalized goal steps may be provided by the digital advisor service 306. The Capacity Analysis and Motivation Analysis GUI 314 provides a personalized step recommendation that fits within the capacities of the user/member. Further, the Capacity and Motivation Analysis GUI 314 provides motivating information to complete the step. For example, in the current embodiment, a recommended spending goal is provided based upon the financial capacity of the member/user. The Capacity and Motivation Analysis GUI 314 provides an indication 316 of whether the step is on track. Here, the spending goal is indicated as "on track" based upon the current spending behaviors received by the digital advisor service.

Further, details of implementation 318 of the goal step may also be provided. Here, percentages of spending budgets consumed by the member/user towards the spending goal are provided.

Additionally, motivational information 320 may also be provided. Here, an indication of a spending deficit of $210 towards the spending goal limit is indicated, which may encourage the member/user to continue to underspend. Account snapshot details 322 may also be provided to motivate the member/user to underspend.

The lifecycle 300 also includes an Action Driving GUI 324, which provides electronic actions that may help facilitate completion of the goal/goal step. For example, in the current embodiment, to help facilitate spending goals/goal steps, an auto-deposit action 326 is provided to the member/user. Additionally, a goal matrix is provided that provides the goals/goal steps of the member/user. The goals may be presented as selectable icons 330 that, when selected, results in a dynamic change on the Action Driving GUI 324 to present particular electronic actions associated with the selected goal/goal step. In some embodiments, new goals may be generated based upon a selection of a particular icon 332.

As may be appreciated, as behaviors change, the GUIs of the lifecycle 300 may change. For example, when actions recommended by the Action Driving GUI 324 are undertaken, the Nurture and Mange GUI 302 and/or the Capacity Analysis and Motivation GUI 314 may dynamically change to indicate the implemented action.

Figure 4A:
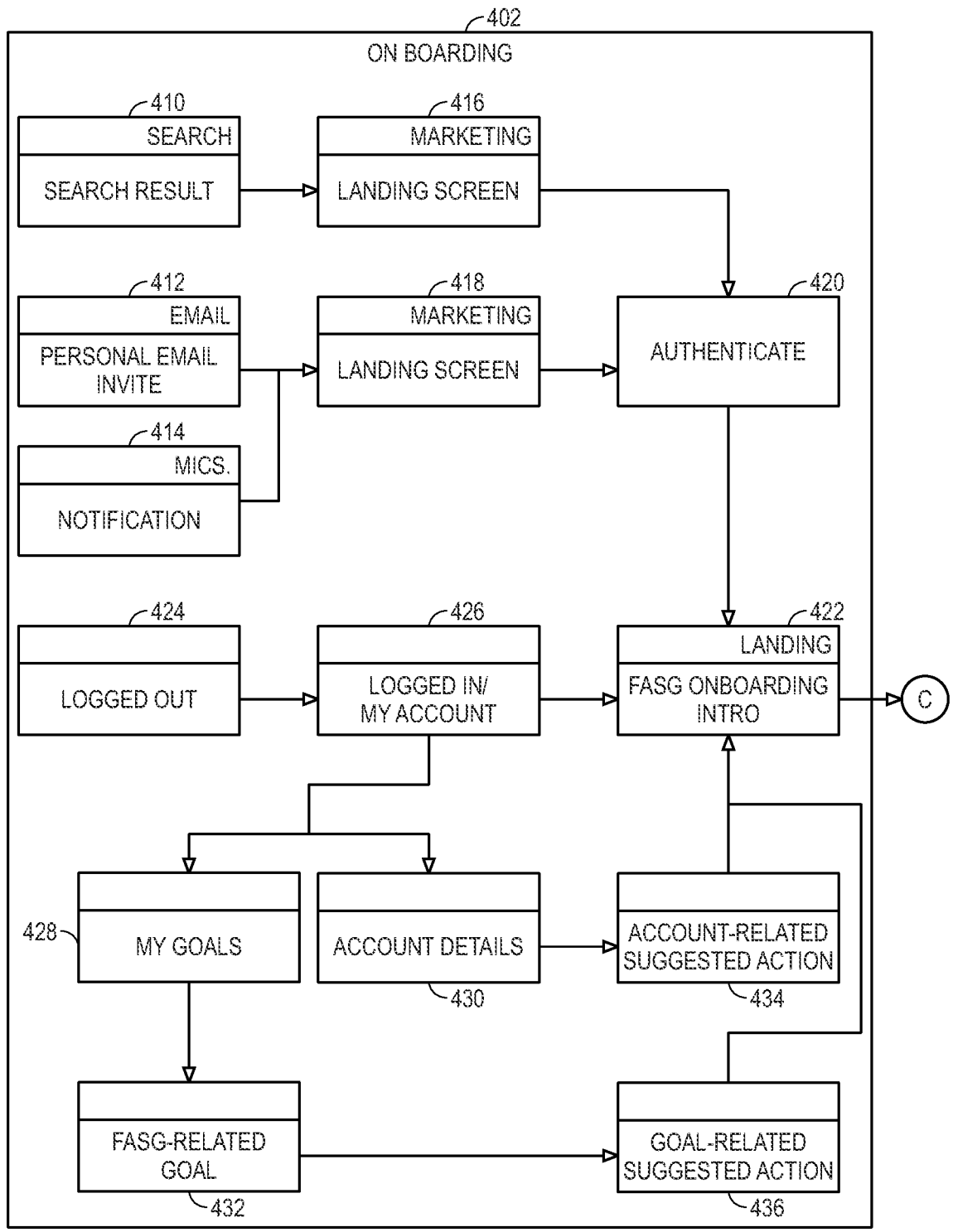
FIGS. 4A-4B are flow diagrams, illustrating onboarding and digital discovery used to facilitate advice provision, in accordance with an embodiment of the present disclosure.
Figure 4B:
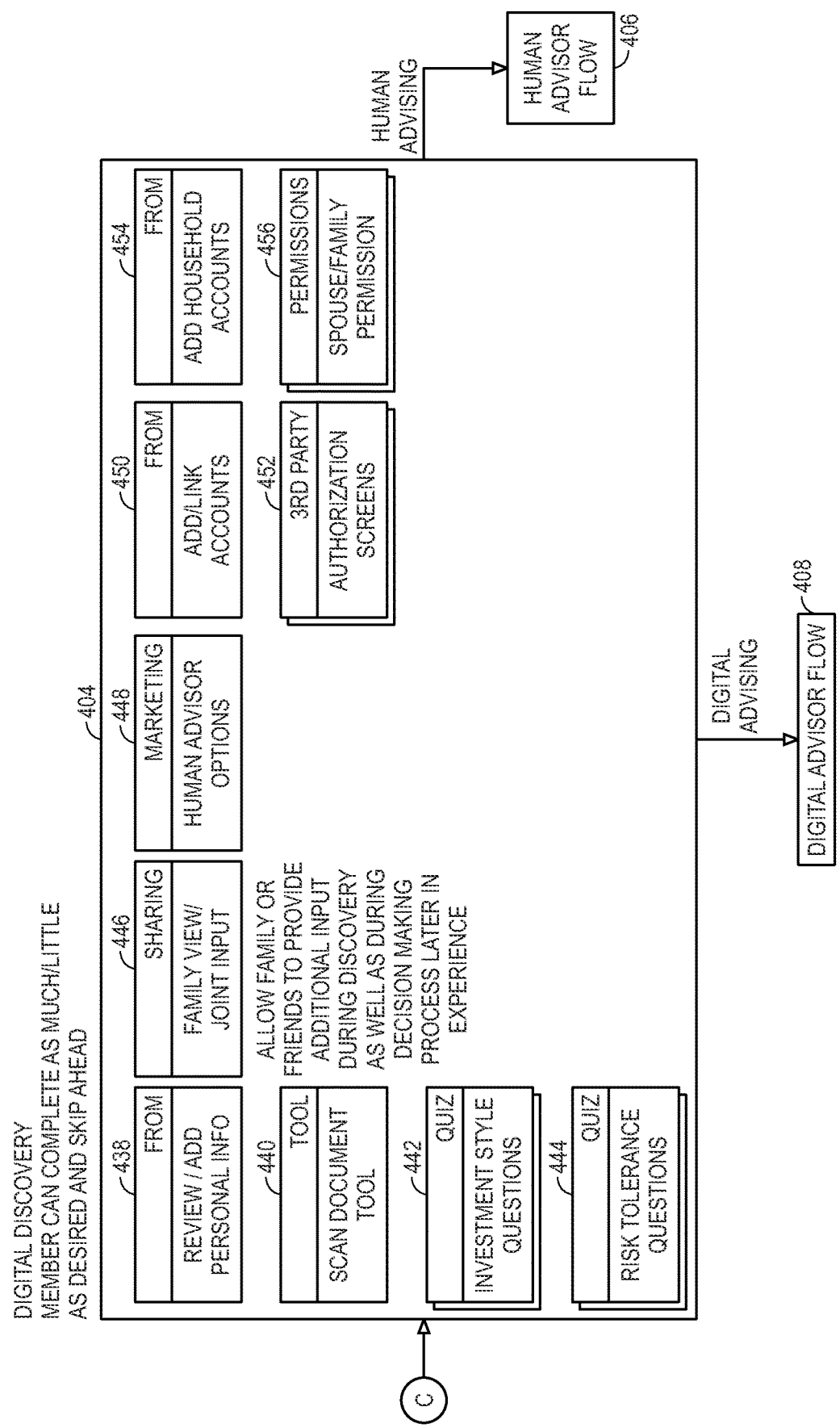
Figure 5A:
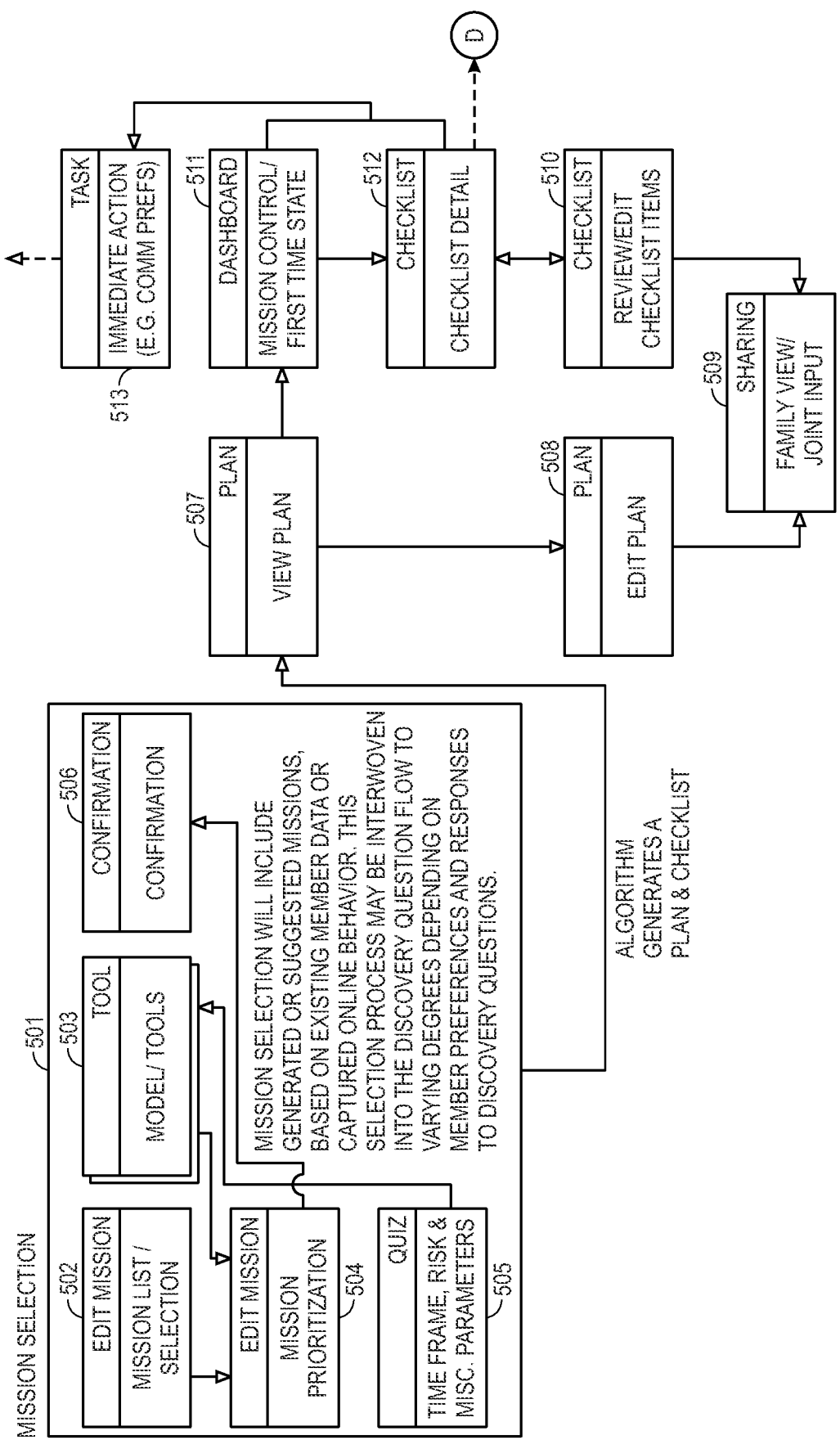
FIGS. 5A-5E are flow diagrams, illustrating a detailed process for provision of digital advice, in accordance with an embodiment of the present disclosure.
Figure 5B:
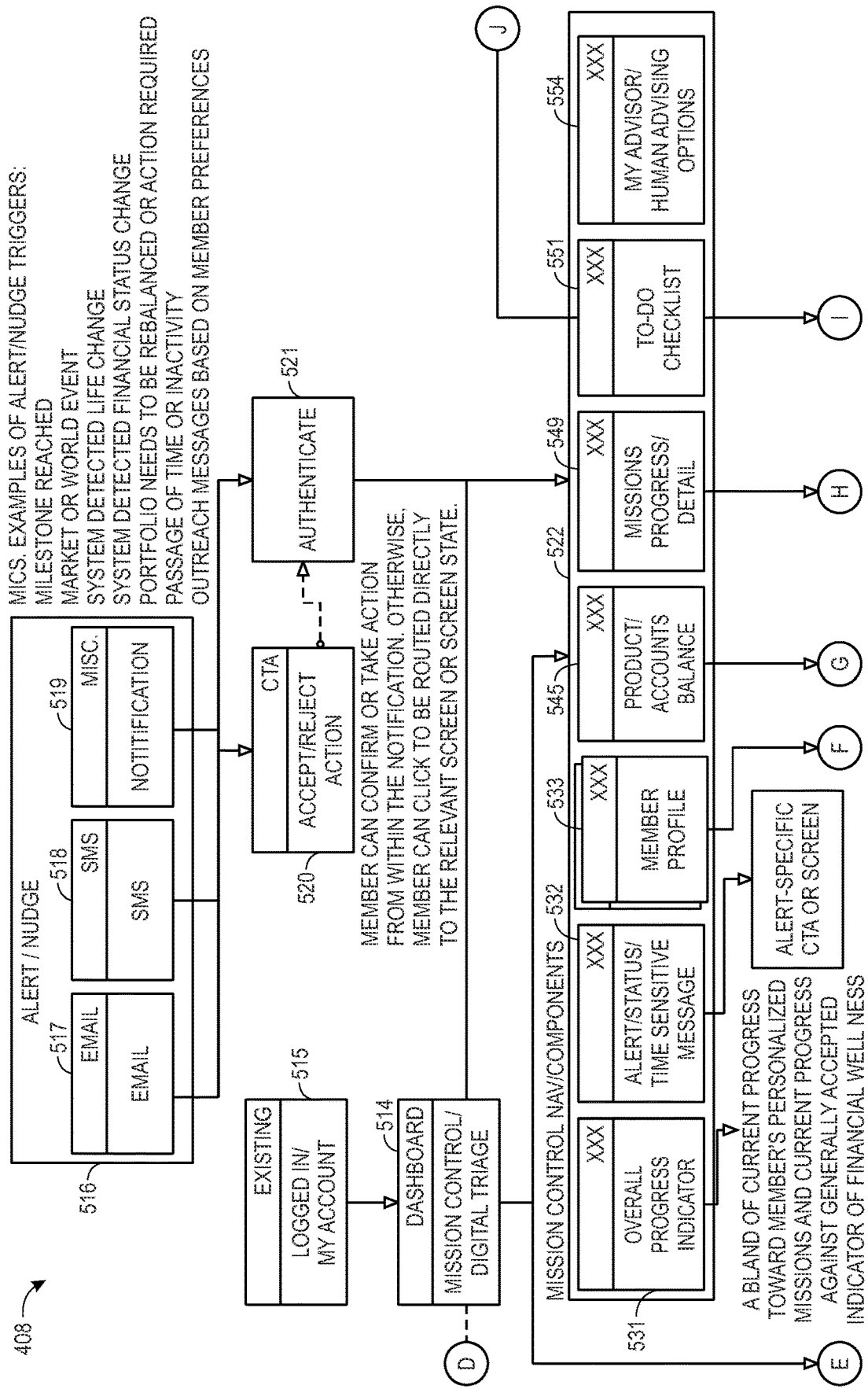
Figure 5C:
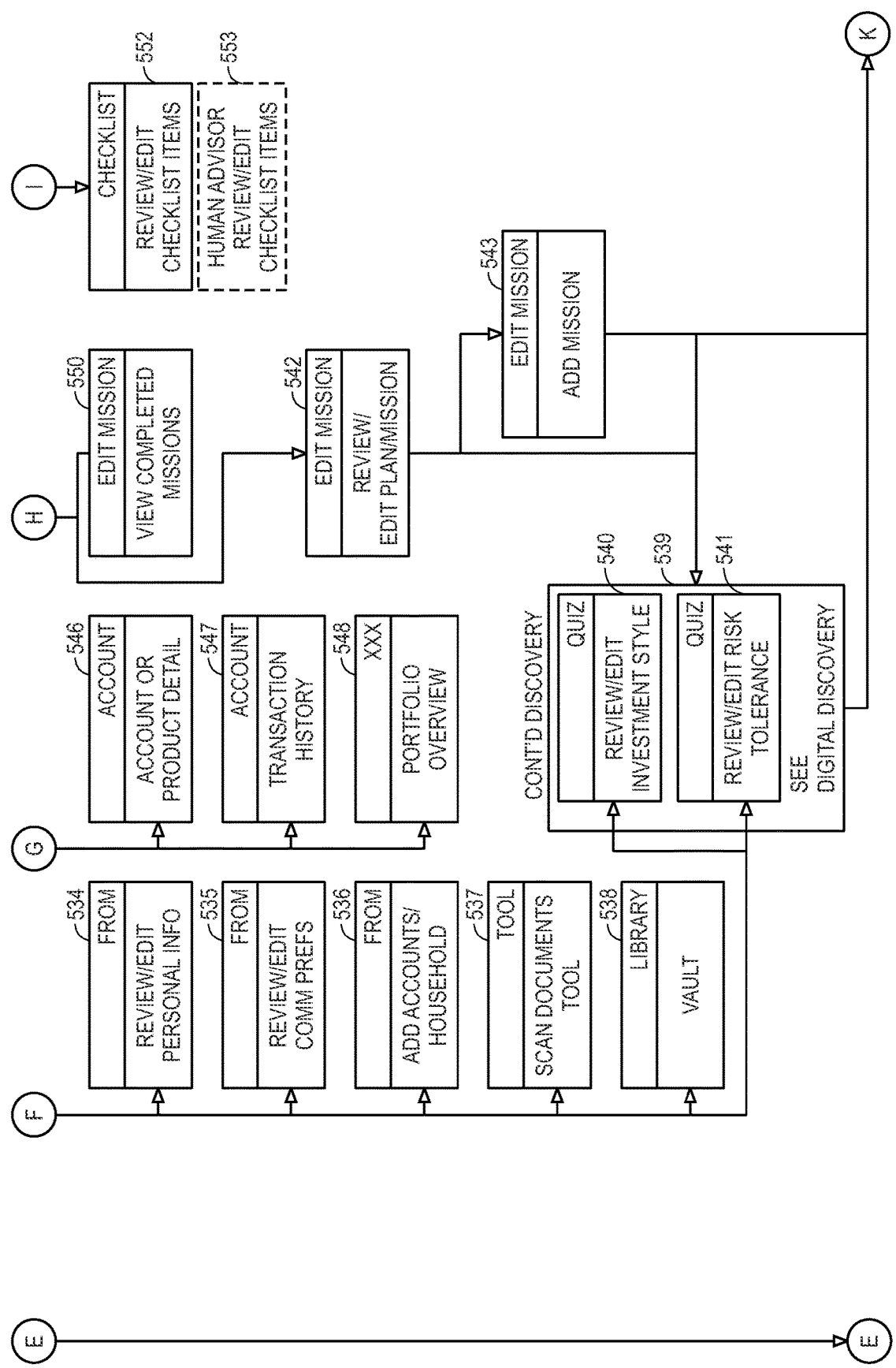
Figure 5D:
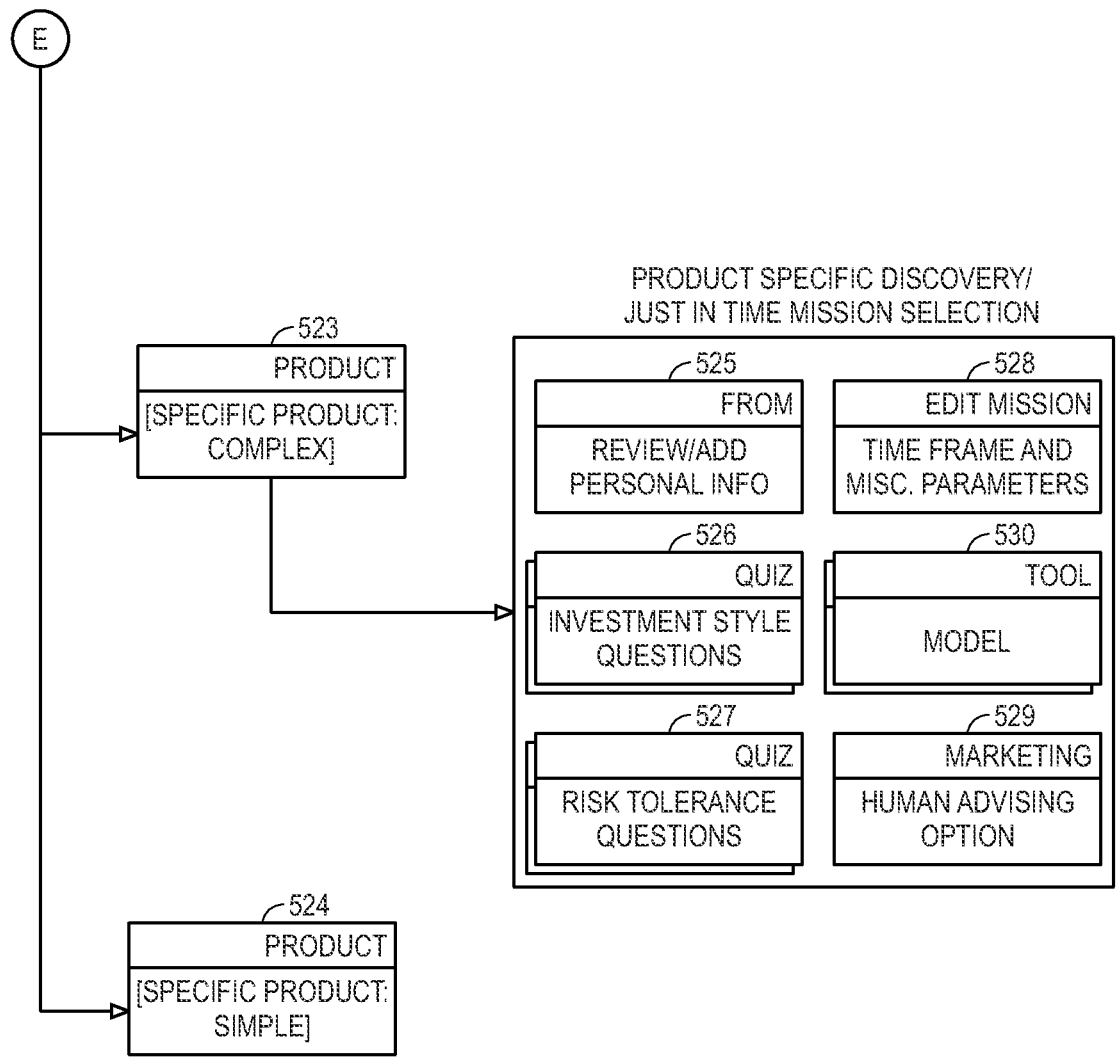
Figure 5E:
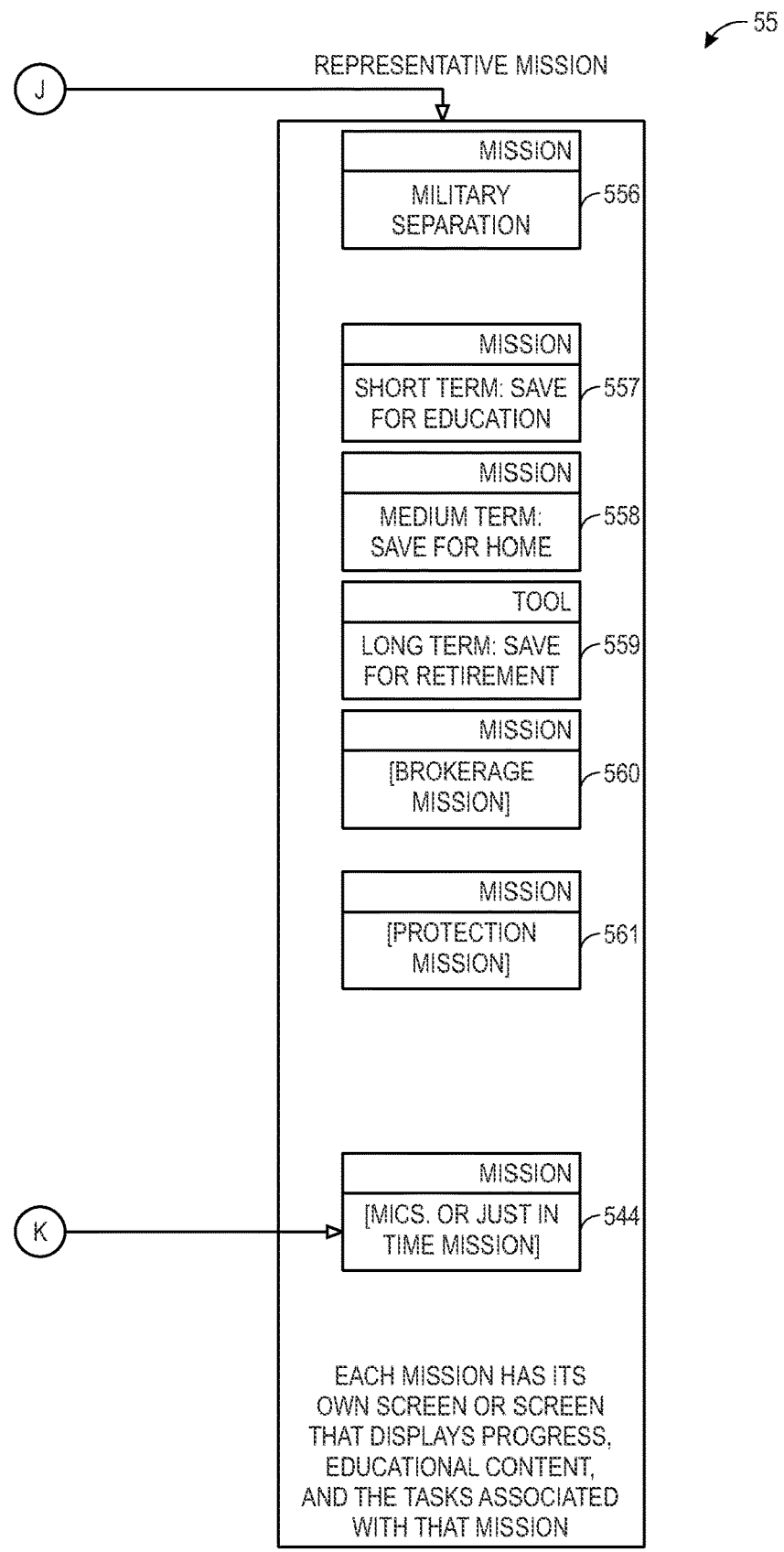

Having discussed the basics of the digital advisor service and the digital advice lifecycle, FIGS. 4A-4B are flow diagrams, illustrating a detailed process 400 for onboarding and digital discovery useful for provision of advice, in accordance with an embodiment of the present disclosure. The process 400 includes an onboarding process 402 for entering the advice provision flow. The process 400 also includes a digital discovery process 404 that provides behavioral attributes and/or other attributes of the member/user for subsequent goal/goal step prioritization/identification. A human advisor flow 406 and/or a digital advisor flow 408 may be implemented based upon attributes attained during the digital discovery process 404.

Starting first with a detailed discussion of the onboarding process 402, the onboarding process 402 is used to bring new members/users into the advice provision flow as well as members/users that have previously used the advice provision flow.

Starting first with a new member/user, the entry point into the advice provision flow can be facilitated, for example, by a search engine result 410 (or other website), a personal email invite 412, and/or other notification 414 (e.g., a text message, push notification, etc.). Generic entry points, such as the search engine result 410, may direct the new member/user to a non-personalized landing page 416. Personalized entry points, such as the personal email notification 412 or the personalized notification 414, may direct the new member/user to a personalized landing page 418. From the landing pages 416 and 418, a new member/user authentication process 420 that authenticates particular member/user information may be triggered. An onboarding introduction landing page 422 may be provided after authentication. The onboarding introduction landing page 422 may present introductory information regarding the digital discovery process 404 and/or the human advisor flow 406 and/or digital advisor flow 408.

Regarding the members/users that have previously used the advice flow, the process starts in a logged out state 424. As the member/user logs in (426), the member/user's goals (428) and account details (430) associated with the member/user's account are retrieved from storage. A particular subset of goals related to a current entity that the member/user is experiencing may be provided. For example, if, after log in, the member/user navigates to a Financial Advice and Services Group (FASG) page to enter the advice flow, a subset of FASG-related goals 432 may identified from the set of existing identified goals 428 personalized for the member/user.

Account-related suggested actions 434 and/or goal-related suggested actions 436 may be identified based upon the account details 430 or the goals 432. These suggested actions 434 and/or 436 may be provided for display to the onboarding introduction landing page 422.

As mentioned above, as a member/user's behaviors change, goals/goal steps and/or information pertaining to these goals/goal steps may change. Accordingly, after onboarding, the digital discovery process 404, which obtains behavioral and/or other attributes associated with the member/users, may be implemented.

The digital discovery process 404 may receive attributes from multiple entities. Accordingly, despite the current entity entry point being an FASG entry point in the current example, attributes regarding the member/user may also be retrieved from other entities. The digital discovery process 404 may obtain attributes from, for example, online digital forms 438, scanned document 440, online investment quizzes 442, online risk tolerance quizzes 444, a joint input GUI 446 that allows others (e.g., friends and/or family to input additional attributes regarding the member/user, etc. The member/user may also input preferences for a human advisor 448 and/or input linked accounts 450, third party data provided after authorization to receive data 452, related household account information 454, and/or spouse and/or family information after permission to receive such data 456. This inputted data may be used to determine particular attributes associated with the member/user.

Based upon the attributes attained during the digital discovery process 404, a human advising flow 406 and/or a digital advisory flow 408 may be implemented. The human advising flow 406 provides access to human advisors for human advice provision. Conversely, the digital advisory flow 408 does not rely on human subjectivity, but instead provides a computer-implemented goal/goal step recommendation, resulting in reduced resource costs.

Focusing on the digital advice, FIGS. 5A-5E are flow diagrams, illustrating a detailed process 500 for provision of digital advice, (e.g., the digital advisory flow 408 of FIGS. 4A-4B), in accordance with an embodiment of the present disclosure. A mission selection process 501 provides generated or suggested missions (e.g., goals/goal steps) based upon existing member/user data and/or captured online behavior. As mentioned above, many of the attributes used for mission selection will be obtained from the digital discovery process 404 of FIGS. 4A-4B. The attributes from the digital discovery process 404 may be applied to one or more behavior attribute-based models to identify suggested missions. For example, the mission selection process 501 may include receiving/identifying a set of relevant mission lists customized to the member/user (502). As mentioned above, behavior attributed-based models 503 may be used to identify a mission prioritization 504 from the mission list 502. A timeframe, risk, and/or other parameters 505 may be applied to the models 503 to identify the mission prioritization 504.

A confirmation process 506 may be implemented to confirm that the mission that the member/user wishes to undertake. For example, a GUI prompt may be provided to confirm with the member/user that the goal/goal steps will be undertaken.

After the goal and/or goal steps are selected and confirmed, the digital advisor service may generate a plan with a checklist of steps to complete the goal. As mentioned above, the digital advisor may implement a plan based upon an identified capacity of the member/user. The plan, once generated, is presented in a Plan View GUI 507. The member/user may edit the plan/steps via an Edit Plan GUI 508. In some embodiments, as mentioned above, a family or other individuals may provide joint input via GUI 509, which may result in further modification to the plan. The digital advisor may then review and/or edit the checklist items (510) based upon inputs received in the GUIs 508 and/or 509.

When no edits to the plan are made, the mission control/first time state 511 may be presented. In such a case or in the case of editing of the plan, checklist details 512 may then be presented via a GUI. As mentioned above, electronic action steps 513 may be suggested via a GUI after the plan is generated.

Steps from the Mission Control Dashboard 514 are illustrated in FIGS. 5B-5E. The Mission Control Dashboard 514 provides an indication of progress towards the plan. The Mission Control Dashboard 514 can be accessed after provision of the checklist detail 512 and/or via the member/user logging in 515. The Mission Control Dashboard 514 may present generated alerts/nudges 516, such as email messages 517, short message services 518, and/or other notifications 519. The alerts/nudges may include information such as market or newsworthy events that may impact plans/goals, digitally discovered life changes, digitally discovered status changes (e.g., financial status changes), recommended actions, and/or other outreach messages. The member/user may accept or reject actions (520) provided in the alerts/nudges 516. In some embodiments, the member/user can confirm or take action from within the alert/nudge 516. In some embodiments, the member/user can click a link in the alert/nudge 516 to be routed to a relevant GUI screen/screen state for the action. Permission to provide the alert/nudges 516 and/or permission to accept/reject actions 520 may be authenticated (521) prior to implementation/provision.

The Mission Control Dashboard 514 may provide the alert/nudges 516, Mission Control Navigation Components 522 and/or particular product offerings (e.g., complex product offerings 523 and/or simple product offerings 524). Simple product offerings 524 may not require specific member/user information. However, complex product offerings may be personalized for a member/user and may require additional details for offering. Accordingly, the digital advisor service may review and/or add personal information of the member/user in the offering (525). Further, electronic investment quiz answers (526), risk tolerance quiz answers (527), mission timeframe & other parameters (528) and/or human advising option preferences (529) from the digital discovery may be applied to a model 530 to identify complex product offerings for the member/user.

The Mission Control Navigation components 522 may include an overall progress indicator 531, which provides a current progress toward personalized missions. Further, the overall progress indicator 531 may include current progress against generally accepted indicators of financial wellness.

Further the Mission Control Navigation components 522 may include an indication 532 of alerts/nudges 516, goal/plan status, time sensitive messages, etc. The Mission Control Navigation components 522 may include member/user profile component 533, which allows the member/user to review/edit personal information (534), review/edit communication preferences (535), add linked accounts and/or household accounts (536), provide scanned documents (537), access secure data in a data vault (538). The information edited from the member profile component 533 can be provided for continued digital discovery (539). For example, in an FASG context, an investment style may be reviewed/edited (540) and/or a risk tolerance of the member/user may be reviewed and edited (541). The updated digital discovery (539) may be used to review/edit a plan and/or mission (542), add a new plan/mission (543), and/or used to generate a Just in Time Mission (544).

The Mission Control Navigation components 522 may also provide a Product/Account Balances component 545. The Product/Account Balances component 545 may provide the member access to view account or product details (546) associated with the member/user, view transaction history (547), and/or provide a product portfolio overview (548) associated with the member/user.

As previously discussed, a Mission Progress/Detail component 549 may also be provided that provides an indication of progress towards a mission (e.g., a goal/goal steps that are part of a plan). A view providing completed missions may be provided 550, a view that enables review/editing of a plan/mission 542 may be provided, and/or a view that allows the addition of new missions (543) may be provided.

The Mission Control Navigation components 522 may include a To-Do Checklist component 551. The To-Do Checklist component 551 may allow the member/user to review/edit checklist items (items that should be completed by the member/user to facilitate plan completion) (552). In some instances a human advisor may review/edit checklist items as implemented checklist item completion is observed by the human advisor (553). Further Human Advising options 554 may also be provided.

Representative missions 555 (e.g., goals) are also illustrated in FIGS. 5B-5E. Each mission may have its own GUI or GUI states that display progress, educational content, and/or tasks that are associated with that mission. The representative missions 555 are meant to provide examples of particular missions, but are not an exhaustive list of missions and are not intended to limit the list of available missions to those provided in FIG. 5B. The list of available missions 555 includes a military separation 556 mission for transitioning from military service to civilian service. Further, the missions 555 include short-term missions (e.g., saving for education 557), medium term missions (e.g., saving for a home 558), and long-term missions (e.g., saving for retirement 559). In the context of FASG, additional missions might include brokerage missions 560, financial protection missions 561, and/or other or Just in Time Missions 544.

Figure 6A:
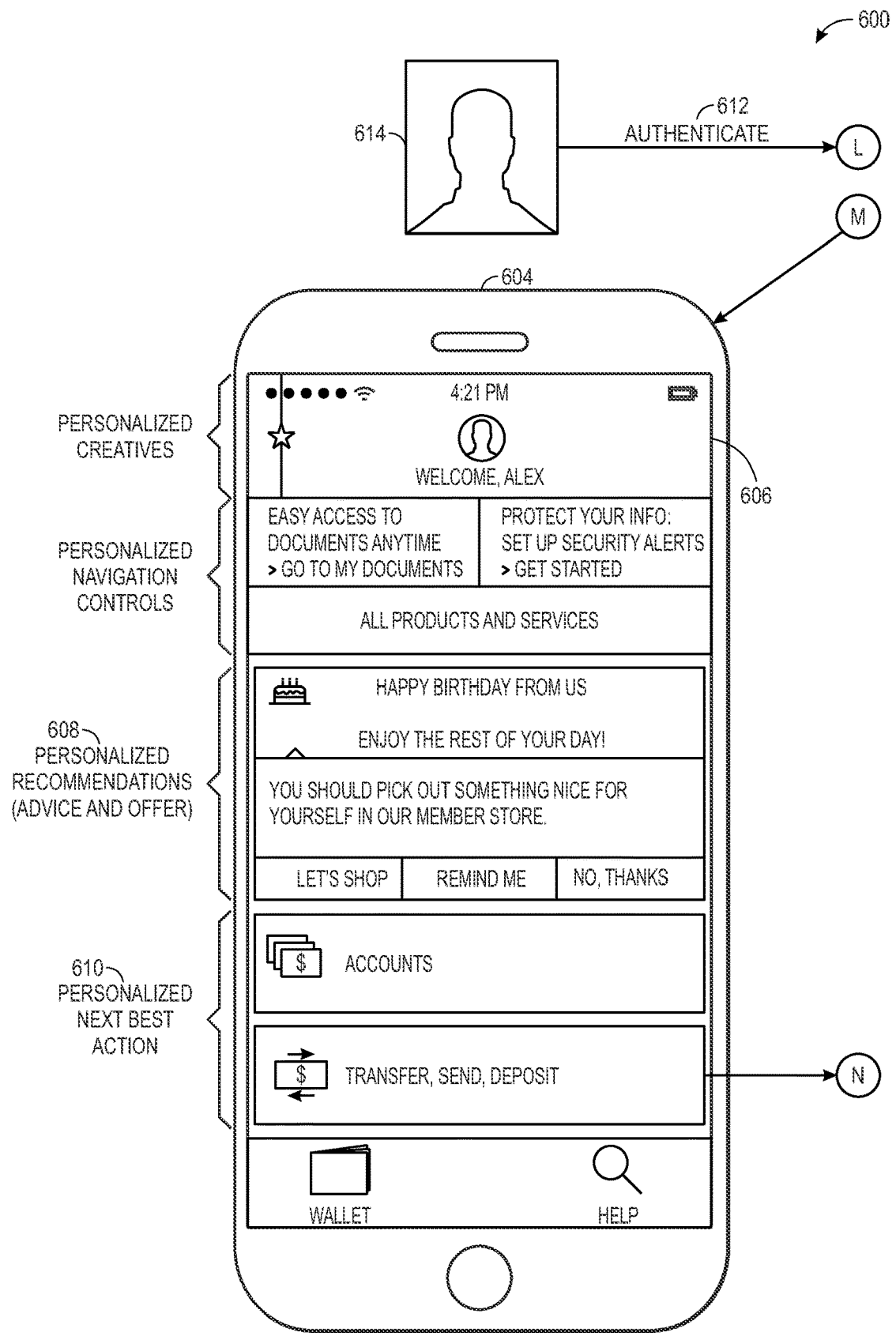
FIGS. 6A-6B are schematic diagrams, illustrating a mobile device application use case, in accordance with an embodiment of the present disclosure.
Figure 6B:
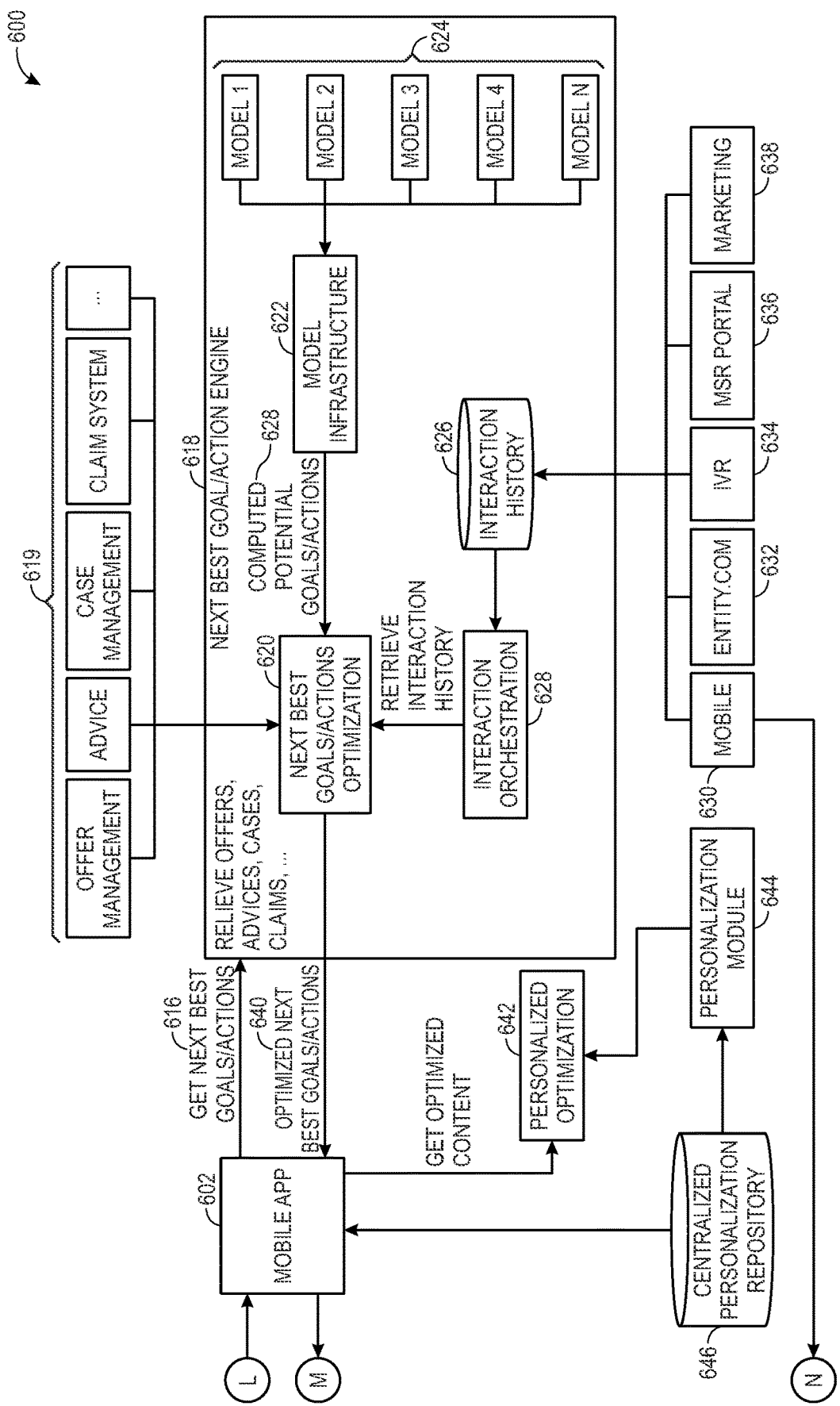

FIGS. 6A-6B are schematic diagrams, illustrating a mobile device application use case 600, which provides digital advice, in accordance with an embodiment of the present disclosure. As illustrated, a mobile app 602 may be implemented on a mobile device 604. The mobile app 602 provides a mobile app GUI 606 that provides entity specific data, including personalized digital advice (e.g., missions/goals/goal steps) 608 and personalized actions 610 to achieve the digital advice, among other content. To provide the digital advice 608 and/or personalized goals and/or actions 610, the mobile app authenticates (612) a member/user 614.

The mobile app 602 may then acquire the next best actions (616) from a Next Best Action Engine 618. The Next Best Action Engine 618 gathers all potential actions, interactions, both from the member/user perspective and the entity perspective. To do this, relevant data 619 (e.g., candidate offers, cases, claims, etc.) are retrieved by the Next Best Goal/Action Optimization Module 620. The Next Best Goal/Action Optimization Module 620 accesses a model infrastructure 622, which accesses a set of models 624, which indicate attributes likely to be associated with particular goals and/or actions. Behavioral attributes (e.g., cross-entity interaction history 626 related to the member/user may be provided by interaction orchestration 628 to apply to the model infrastructure 622 to determine the potential goals/actions 629. The cross-entity interaction history 626 includes interaction history from the mobile device 604 (630), entity website interactions (632), interactive voice response (IVR) interactions (634), member service representative portal interactions (636), and/or other marketing interactions (638).

A top set of optimized next best goals/actions 640 is derived by the Next Best Goal/Action Optimization module 620, by selecting a top set of goals/actions based upon defined business objectives, goals, and/or constraints. The optimized next best goals/actions 640 are provided back to the mobile app. Personalized optimization of goal/action selection 642 may be implemented to further define particular goals/actions applicable to the member/user. The personalization module 644 uses the centralized personalization repository 646 to retrieve personal information pertaining to the member/user to provide a particular plan to achieve the goal/actions (e.g., based upon the capacity of the member/user). The personalized goals/actions may then be presented by the mobile app 602 on the mobile device 604.

Figure 7:
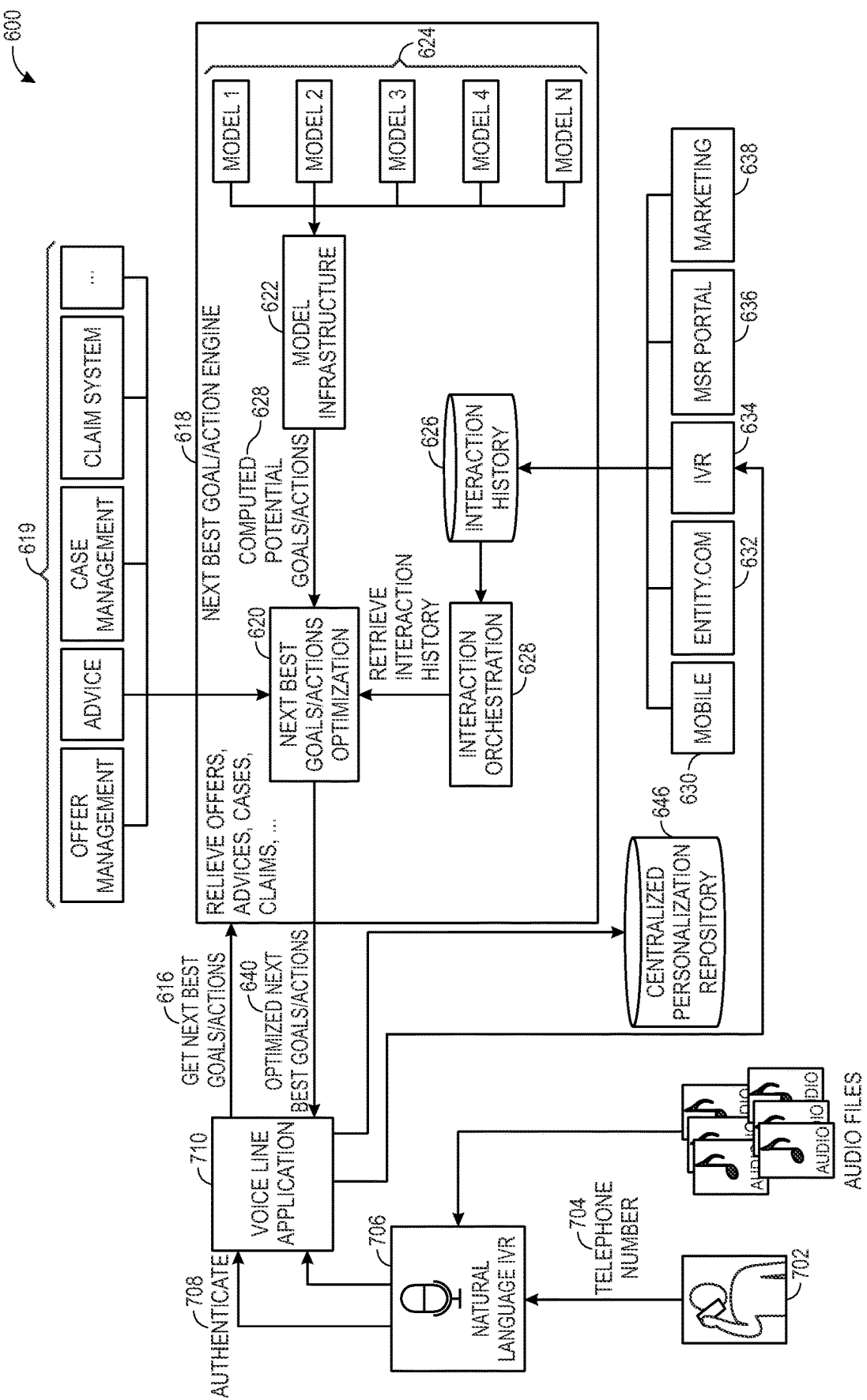
FIG. 7 is a schematic diagram, illustrating a mobile device application use case, in accordance with an embodiment of the present disclosure.

FIG. 7 is a schematic diagram, illustrating a mobile device application use case 700, in accordance with an embodiment of the present disclosure. The use case 700 begins with the member/user 702 using a telephone number 704 to access an interactive voice recognition (IVR) system 706. The IVR system 706 authenticates the member/user (708) and, using a voice line application 710, requests a next best goal/action (712).

The Next Best Action Engine 618 gathers all potential actions, interactions, both from the member/user perspective and the entity perspective. To do this, relevant data 619 (e.g., candidate offers, cases, claims, etc.) are retrieved by the Next Best Goal/Action Optimization Module 620. The Next Best Goal/Action Optimization Module 620 accesses a model infrastructure 622, which accesses a set of models 624, which indicate attributes likely to be associated with particular goals and/or actions. Behavioral attributes (e.g., cross-entity interaction history 626 related to the member/user may be provided by interaction orchestration 628 to apply to the model infrastructure 622 to determine the potential goals/actions 629. The cross-entity interaction history 626 includes interaction history from the mobile device 604 (630), entity website interactions (632), interactive voice response (IVR) interactions (634), member service representative portal interactions (636), and/or other marketing interactions (638).

A top set of optimized next best goals/actions 640 is derived by the Next Best Goal/Action Optimization module 620, by selecting a top set of goals/actions based upon defined business objectives, goals, and/or constraints. The optimized next best goals/actions 640 are provided back to the mobile app. The voice line application 710 uses the centralized personalization repository 646 to retrieve personal information pertaining to the member/user to provide a particular plan to achieve the goal/actions (e.g., based upon the capacity of the member/user). The personalized goals/actions may then be presented by the IVR 706 by accessing and presenting appropriate audio files 712 that present the personalized goals/actions. User interactions/selections with the IVR 706 may impact the goals and may be provided for IVR interaction history 634.

The systems and techniques provided herein provide significant value in a world with increasing online activity. By providing systems that proactively retrieve and analyze cross-entity behavioral attributes to identify personalized digital advice, more accurate personalizing of online experiences may be provided.

The invention claimed is:

1. A tangible, non-transitory, computer readable medium comprising instructions that when executed by one or more processors of the computer cause the computer to:
    retrieve, via an electronic data source, historical behavioral interactions of a user with electronic services;
    predict a goal that a user desires to achieve based on the historical behavioral interactions;
    determine one or more personalized digital goals that apply to the goal based on the historical behavioral interactions;
    provide, via a graphical user interface (GUI), the one or more personalized digital goals;
    identify and provide, via the GUI, an indication of a spending deficit with respect to the one or more personalized digital goals; and
    update the one or more personalized digital goals based upon a capacity of the user indicated by the spending deficit.

2. The computer readable medium of claim 1, comprising instructions that when executed by the one or more processors of the computer cause the computer to:
    optimize the one or more personalized digital goals by reducing a number of the one or more personalized digital goals, by:
        selecting a subset of the one or more personalized digital goals specifically relevant to the at least one of the electronic services.

3. The computer readable medium of claim 1, comprising instructions that when executed by the one or more processors of the computer cause the computer to:
    optimize the one or more personalized digital goals by reducing a number of the one or more personalized digital goals, by:
        selecting a subset of the one or more personalized digital goals specifically relevant to personalized data of a user.

4. The computer readable medium of claim 1, comprising instructions that when executed by the one or more processors of the computer cause the computer to:
    access personal data of the user; and
    identify, using the personal data, a capacity of the user to complete the one or more personalized digital goals.

5. The computer readable medium of claim 4, comprising instructions that when executed by the one or more processors of the computer cause the computer to:
    generate a plan to complete the one or more personalized digital goals based upon the capacity of the user.

6. The computer readable medium of claim 1, comprising instructions that when executed by the one or more processors of the computer cause the computer to:
    identify one or more electronic actions useful to implement the one or more personalized digital goals; and
    provide, via a graphical user interface, access to the one or more electronic actions.

7. The computer readable medium of claim 1, comprising instructions that when executed by the one or more processors of the computer cause the computer to:
    onboard the user, by:
        providing a personalized email or other notification;
        direct the user, in response to an interaction with the personalized email or other notification to a personalized landing page.

8. The computer readable medium of claim 1, comprising instructions that when executed by the one or more processors of the computer cause the computer to:
    onboard the user, by:
        identifying that the user is a previous user of a digital advisor service; and
        in response to identifying that the user is the previous user of the digital advisor service, access and provide one or more previously identified personalized digital goals as the one or more personalized digital goals.

9. The computer readable medium of claim 8, comprising instructions that when executed by the one or more processors of the computer cause the computer to:
    identify user information changes that affect the one or more previously identified personalized digital goals; and modify the one or more previously identified personalized digital goes based upon the information changes.

10. The computer readable medium of claim 1, wherein the instructions that when executed by the one or more processors of the computer cause the computer to determine the goal by providing the historical behavioral interactions to a predictive model.

11. The computer readable medium of claim 1, wherein the goal comprises a purchase the user is going to make.

12. A computer-implemented method, comprising:
retrieving, via an electronic data source, historical behavioral interactions of a user with electronic services;
determining a goal that a user desires to achieve based on the historical behavioral interactions;
determining one or more personalized digital goals that apply to the goal based on the historical behavioral interactions;
providing, via a graphical user interface (GUI), the one or more personalized digital goals;
identifying and providing, via the GUI, an indication of a spending deficit with respect to the one or more personalized digital goals; and
updating the one or more personalized digital goals based upon a capacity of the user indicated by the spending deficit.

13. The computer-implemented method of claim 12, comprising:
optimizing the one or more personalized digital goals by reducing a number of the one or more personalized digital goals, by:
selecting a subset of the one or more personalized digital goals specifically relevant to the at least one of the electronic services.

14. The computer-implemented method of claim 12, comprising:
optimizing the one or more personalized digital goals by reducing a number of the one or more personalized digital goals, by:
selecting a subset of the one or more personalized digital goals specifically relevant to personalized data of a user.

15. The computer-implemented method of claim 12, comprising:
accessing personal data of the user; and
identifying, using the personal data, a capacity of the user to complete the one or more personalized digital goals.

16. The computer-implemented method of claim 15, comprising:
generating a plan to complete the one or more personalized digital goals based upon the capacity of the user.

17. The computer-implemented method of claim 12, comprising:
providing a personalized email or other notification; and
directing the user, in response to an interaction with the personalized email or other notification to a personalized landing page.

18. The computer-implemented method of claim 12, wherein the goal comprises a purchase the user is going to make.

19. A computer system, comprising:
a tangible, non-transitory, computer-readable medium;
one or more processors;
computer-readable instructions, stored on the tangible, non-transitory, computer-readable medium that, when executed by the one or more processors, cause the computer system to:
retrieve, via an application programming interface (API), cross-entity historical behavioral interactions of a user with electronic services provided by a plurality of entities;
apply the cross-entity historical behavioral interactions on a predictive model to predict a potential behavior the user is going to make;
determine one or more personalized digital goals that apply to the cross-entity historical behavioral interactions based on the potential behavior;
provide, via the API, the one or more personalized goals to at least one of the electronic services for subsequent display of the one or more personalized digital goals via the at least one of the electronic services;
identify and provide, via the API, an indication of a spending deficit with respect to the one or more personalized digital goals; and
update the one or more personalized digital goals based upon a capacity of the user indicated by the spending deficit.

20. The computer system of claim 19, wherein the goal comprises at least one of taking a vacation, purchasing a vehicle, or purchasing a home.

* * * * *